Aug. 30, 1966    E. A. DELLENBAUGH    3,269,886
ARTISTIC MASONRY ITEM AND METHOD OF MAKING
Filed June 17, 1964                2 Sheets-Sheet 1

ERNEST A. DELLENBAUGH
INVENTOR.

BY
Atty.

Aug. 30, 1966   E. A. DELLENBAUGH   3,269,886
ARTISTIC MASONRY ITEM AND METHOD OF MAKING
Filed June 17, 1964   2 Sheets-Sheet 2
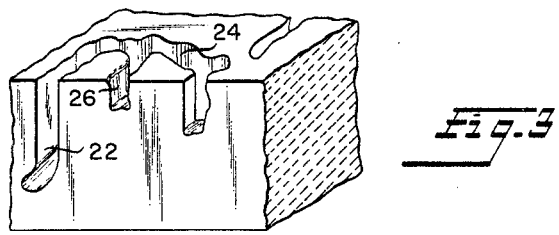
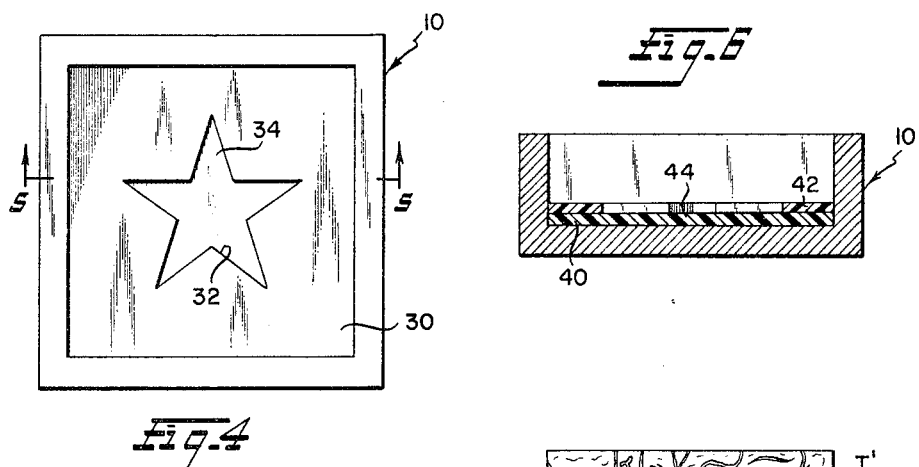
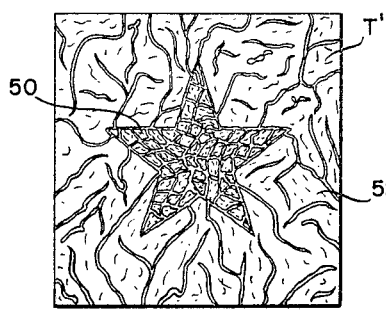
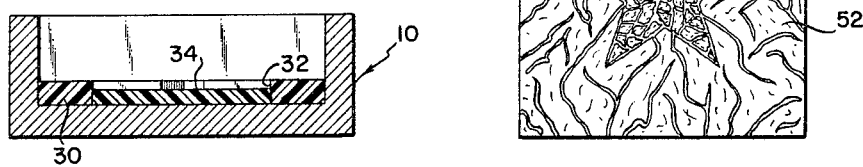
INVENTOR
*Ernest A. Dellenbaugh*
BY
ATTORNEY United States Patent Office 3,269,886
Patented August 30, 1966

3,269,886
ARTISTIC MASONRY ITEM AND METHOD
OF MAKING
Ernest A. Dellenbaugh, Edmond, Okla., assignor of one-half to R. J. Purtell, Brownfield, Tex.
Filed June 17, 1964, Ser. No. 376,312
19 Claims. (Cl. 161—117)

This invention relates to the ornamenting of articles and to the method of creating artistic ornamental designs on molded cementitious products and is a continuation-in-part of my application Serial No. 276,420 filed April 29, 1963, now abandoned.

This invention contemplates the production of a surface design for tiles, bricks, dishes, bric-a-brac, molded articles whether they have a flat or curved surface. By this invention, a pleasing ornamental artistic design may be created on the surface of any mold cementitious products quickly, inexpensively, and with the minimum of structural weakening of the article. The cementitious material to be molded incorporates water which through reacting with the cementitious mass to set the same, also reacts upon a film of material to swell the same when the cementitious material is brought into contact with the film.

Though this disclosure deals primarily with masonry products, it will be obvious from further reading that the invention is also applicable to the molding of other cementitious material which contain therein water which would swell a film when the cementitious material is placed in contact with said film.

An object of this invention is to provide a method of creating artistic designs on the surface of articles which are both attractive and durable.

Another object of this invention is to provide a surface design which may be adaptable on flooring tiles or the like to produce an anti-skid attractive pattern to the tiles.

Another object is to provide an article having areas of different texture though incorporating the same general design.

Another object is to provide a method of manufacturing ornamented articles which can be done in a very short period of time and with a minimum of effect.

A further object is to provide a method of forming an article which is utilizable by inexperienced and unskilled personnel.

Still a further object is to provide an artistic ceramic article which will readily take color in the green ware state and which color produces pleasing variations after being fired.

A still further object is to provide a method of casting ceramic articles wherein mistakes or miscalculations in pouring or molding are hidden by the surface design since the imperfections blend in with the design.

A still further object is to provide a method for casting various cementitious materials to provide a sure and better release from the form wherein they are cast.

Yet another object is to provide a film which is soft and easy to handle and relatively unaffected by oils and many of the common chemicals.

A further object is to provide a method for joining two formed surfaces so that they adhere together.

Another object is to provide a method of embedding ornamental articles such as chips into the surface of the molded article.

Yet another object is to produce an article which has a smooth surface between the ornamental indentations.

Another object is to achieve the above with a film which is tough and which may be staple, sewed or otherwise attached together or attached to other articles, or which can be adhered by heat sealing.

Yet another object is to provide an article which is structurally strong.

A still further object is to provide an article which may have areas of ornamental design intermittent with areas of non-design.

A still further object is to provide a tile for kitchens and the like which is attractive and pleasing to the housewife.

Another object is to provide a parting material for a molded article which can be used in the form and which will react with the fluid in the article composition for the purpose of obtaining different variations in configuration.

These and other objects and advantages of this invention will be apparent from the following description and claims.

In the accompanying drawings which illustrate by way of this invention:

FIGURE 3 is an enlarged sectional fragmentary perspective view of a portion of a tile product as produced by this invention.

FIGURE 4 is a top plan view of the mold disclosing one type of film design positioned therein.

FIGURE 5 is a cross sectional view taken on the lines 5—5 of FIGURE 4 and viewed in the direction of the arrows.

FIGURE 6 is a view similar to this shown in FIGURE 5 utilizing a modified type of film.

FIGURE 7 is a plan view showing a tile as produced in the mold shown in FIGURE 4.

Figure 1:
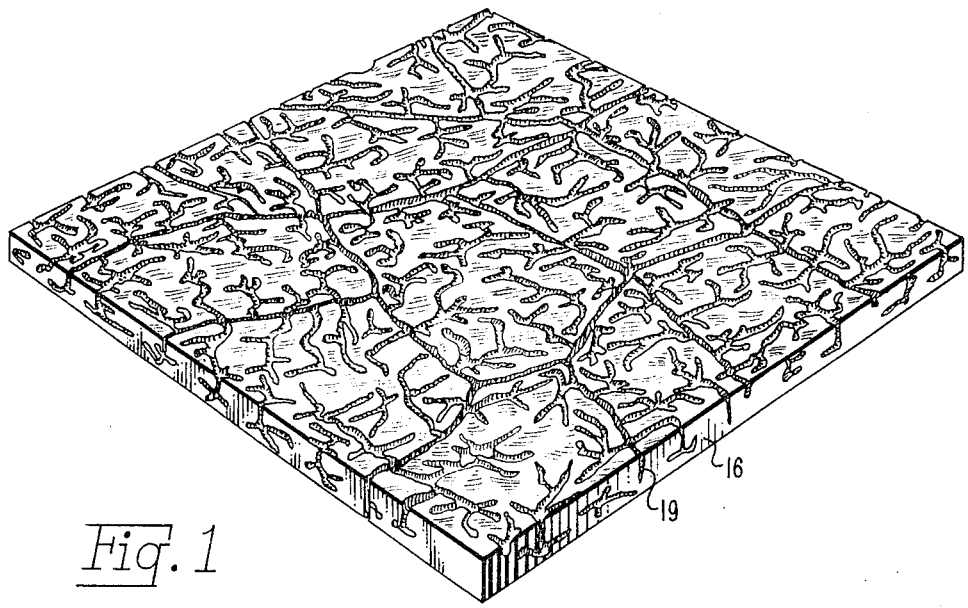
FIGURE 1 is a perspective view of a tile product as produced by this invention.
Figure 2:
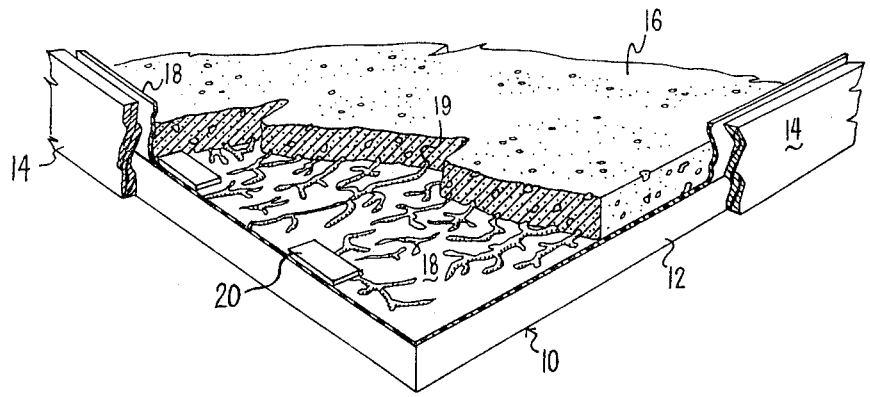
FIGURE 2 is fragmentary perspective view of the mold and the material in the mold showing a portion of the assembly broken away in order to more adequately illustrate the invention.

Referring more particularly to the drawings, FIGURE 1 shows a tile 16 as produced by the mold or form 10 illustrated in FIGURE 2. The form 10 has a flat bottom 12 and sidewalls 14. Exposed to the bottom 12 and along the sidewalls 14 is a thin generally smooth surfaced, water swellable film 18. This film is described in more detail later and for the present time, it will be referred to as a hot water soluble polyvinyl alcohol film and will be abbreviated as HWS-PVA.

With the film thus arranged, the cementitious material is placed within the form. By the term cementitious material, we mean many of those type compositions such as ordinary plaster of Paris, readily available cements such as Portland cements, tile compositions, pottery slips, and pottery clay or any other of the general type water carrying cementitious products.

The film 18 when disposed in the form may extend up the sides of the mold. Arrangement of this type will not only ornament the front face of the tile 16 but also the side edges as shown in FIGURE 1.

After the film 18 has been placed in the form, the fluid or plastic cementitious material is poured or otherwise deposited into the form 10. The wet cementitious material in contact with the film 18 transfers water from the wet cementitious material to the film and the film expands. Since the form 10 is rigid, the film expands upwardly into the wet material and assumes a wrinkled appearance. The wrinkles of the film 18 form indentations 19 in the tile.

It is interesting to note that the wrinkles form in the tile 16, a nonuniform pattern. The pattern or ornamentation on the tile has the appearance similar to a contour map which would show a drainage system of an area. For the most part, the indentations 19 of the design have the appearance of interconnecting rivers or arteries having tributaries and branches extending from said tributaries.

FIGURE 1 shows connected arteries to have tributaries which in turn have branches. It is to be noted that for the most part the lineated grooves or indentations 19 are all interconnected. A small number of disconnected grooves or indentations 19 develop as illustrated in FIGURE 1. These disconnected areas are for the most part, few in number.

It is further interesting to note that the formation of the indentations 19 is unique in that the sidewalls thereof are nearly perpendicular to the planar surfaces of the tile and do not for the most part show rounded edges or sloping channelways.

The design also might be linked or compared to a crazed pattern as though the tile had many fine cracks formed in it after molding and during firing. This effect might also be termed a crackled effect.

FIGURE 3 illustrates a variation in depth in the grooves.

As has been noted, the design will simulate a crazed pattern. The depth of the wrinkles and the width of the wrinkles and the spacing between the wrinkles will be controlled to some extent by the thickness of the film 16 used. A vinyl film of 3 mils thick without stretching produces indentations in a masonry product that will be for the most part from $\frac{1}{16}$ to $\frac{1}{4}$ inch deep prior to setting. Some of the indentations will be almost hairline in width. A variation can also be introduced by removing the masonry product from the mold when it is still slightly damp. When the film is pulled from the surface of the masonry product, this will tend to make a wider indentation than otherwise. It is also possible by using different thicknesses of film in overlay or in general arrangements as indicated in the drawings, to produce new and different thicknesses of film in overlay or in general arrangements as indicated in the drawings, to produce new and different designs or patterns. Changes in temperature and pressure will also result in different patterns. Similarly variations in the stiffness of the cementitious material poured into the mold and stretching the film when it is applied to the mold will also produce different design effects. In general, the addition of rocks and other aggregates within the plastic composition has no appreciable effect on the surface ornamentation achieved.

Such variations of design may be utilized in the production of acoustical materials. The process taught by this invention tends to eliminate air bubbles in the top surface giving a smoother effect to the top surface since the air tends to depart from the grout through the surface indentations rather than on the flat planar surface of the article.

Tiles produced by this invention are adaptable for clinging vines which have a better purchase in the grooves. The surface indentations further improve the thermal insulating qualities of the tiles.

Though flat surfaces are shown in the drawings, it will be obvious that various curved or irregular surfaces can be ornamented by this invention and that no trowelling or stippling will be necessary. This reduces the cost of the finished product and since the film may be readily stripped from the mold either mechanically, manually, or by the use of a flushing solvent, the cost of the finished product is reduced.

The tile is particularly useful in slick areas such as around swimming pools or industrial areas where oil, grease, or water or the like will tend to make walking hazardous. The tile therefore has not only a pleasing appearance but also a safety factor.

THE FILM

From the standpoint of utility, the film used will depend upon whether it is partially or compeltely water soluble. Important is the water equillibrium rate which is the amount and/or percent of water that will be imbibed within the film to accomplish the desired pattern in the finished product. I have found that polyvinyl alcohols (PVA) films are critical to this invention. Polyvinyl alcohol made by the hydrolysis of polyvinyl acetate and modified by varying the degree of substitution (hydrolysis) and degree of polymerization of the polyvinyl acetate starting material (molecular weight).

*Example A.—High viscosity, complete hydrolysis*

Polyvinyl acetate having 170,000–220,000 molecular weight is hydrolized to 91–100%. The resulting film product has the highest degree of water resistance of the examples and is identified as the HWS-PVA.

*Example B.—Low viscosity, partial hydrolysis*

Polyvinyl acetate having 30,000–35,000 molecular weight is hydrolized to 79–90%. This film readily dissolves in cold water. It would be identified as CWS-PVA.

*Example C.—High viscosity, partial hydrolysis*

Polyvinyl acetate having 170,000–220,000 molecular weight is partially hydrolyzed to 79–90%. The film sensitivity to water pickup is not great as Example B.

*Example D.—Low viscosity, complete hydrolysis*

Polyvinyl acetate having 30,000–35,000 molecular weight is hydrolized to 91–100%. The film has a high degree of water resistance, but it picks up water more readily than Example A.

With regard to polyvinyl alcohol, the percent of acetylation and temperature of the water is important since water temperature as well as length of time in which the molded item is cured will affect the amount of ornamentation. Of particular applicability is a film product manufactured by the Mono-Sol Corporation of Gary, Indiana, a division of the Baldwin Montrose Chemical Company, Inc. and is identified by their designation as Mono-Sol PVA-CWS 7–000 series, and PVA-HWS 1–000 series packaging films.

It has been found that a hot water soluble PVA film will work more satisfactorily than a cold water PVA (polyvinyl alcohol) in most applications. The cold water film tends to disintegrate too rapidly to produce a good pattern on the article to be ornamented. The hot water film is soluble in hot water and semi-soluble in cold water but does not disintegrate in cold water. Therefore the hot water film can be left for long periods of time since it does not disintegrate until hot water at a certain temperature is used against the film. The cementitious type compositions may be regular plaster of Paris, lime cement, or other ordinary and readily available cement and tile compositions containing water. The tiles produced by this process may be subsequently fired or additionally treated.

Referring again to the use of a water soluble PVA type film, such a film is made by reacting methyl alcohol with polyvinyl acetate and controlling the degree of polymerization. It is polymerized to a degree of hydrolysis of 87% to 89%. Stated otherwise, the end product will have a degree of 11% to 13% acetylation. When it is contacted with water, it begins to expand in 15 seconds. The expansion forms indentations within the cementitious product.

The fineness of the pattern is greatly affected by the flexibility or pliability of the film E.g. if a one mil (.001 inch) film thickness is used, a very fine crazed pattern will result. Whereas, if a three mil film is used, a coarser crazed pattern will result. If a six mil or thicker film is used, the pattern produced is hardly crazed, but is more one resembling the surface of wrinkled cloth.

VARIATIONS

In addition to changing the characteristical patterns by changing the thickness of the film, the characteristics of the pattern may also be changed by altering the film otherwise. One such method of altering the characteristics of the film is to press it with hot iron. If a one mil film is pressed with a hot iron (about 250° F.) the film will have somewhat more the characteristics of a film of three mil thickness. I.e. the crazed pattern will not be so fine.

Likewise, the characteristics of the film may be changed by coating the film. E.g. the film may be painted or sprayed with varnishes or shellacs and this will make the film less flexible, less pliable and therefore, a larger crazed pattern will result. Also, there will be more of a sloping or a rounding of the edges into the indentations inasmuch as the film is not quite so pliable or flexible. Although as stated above, varnish or shellacs may be used, they do not have good compatibility with the film. Therefore, I have found that I have better results using a synthetic plastic type coating particularly one of an acrylic ester polymer. These are commercially available on the market dissolved in volatile aromatic hydrocarbons in a Freon propellant.

The PVA films are excellent for reproducing patterns of natural origin. E.g. if it is desired to reproduce a footprint, the film can be spread over the footprint as is and plaster of Paris poured into the film. The film will swell to fit the contours of the print, yet upon completion, the print itself will not be destroyed. Another example is that a tire track could be covered with the water swellable film and plaster of Paris poured into the indentation. Again the film would expand to fit all the contours, but would still provide an excellent release surface of the soil and also an excellent release surface from the plaster of Paris.

It will be pointed out that the use of these films are particularly advantageous in ceramic production, since almost any material such as wood can be used for the forms for ceramic production because of the excellent release characteristics of the film. Furthermore, after the pottery slip has hardened and the material removed from the mold (called green goods) the design can be painted in them. Irregularity of shape gives a pleasing characteristic to the coloring after it is fired. I.e. the coloring tends to run to the low places; to run into the indentations and crevices. Furthermore, if two different designs are used as mentioned before, there is a natural indentation formed between the areas of different design.

It is obvious that other variations and pleasing effects may be obtained by applying a different colored grout to the finished article thereby filling in the grooves. The articles may be also stained or varnished to highlight the crazed effect or when a ceramic composition is used, fired to produce a glazed article.

Cleaning the article may be done by flushing as heretofore mentioned or by steaming.

In the building trades, the tiles may be used in foundations, fireplaces, mantles, or dishware.

The PVA film is particularly good since it does not tend to adhere or stick to the mold. This makes it easy to remove from the mold and maintains the mold in a clean and reusable condition. Utilization of the process taught by this invention also aids in reducing weight of the articles. The irregularities and random arrangement of the grooves tends to make the articles structurally stronger than oriented lined type articles.

Air entrained cement or concrete made from air entrained cement produced some interesting patterns also. Air entrained cement produces a wormhole effect.

DESIGNS

FIGURE 4 shows the form 10 having a film 30 having a cut out portion 32 at the center thereof which could be in the shape of a star as illustrated or any other fanciful design.

It is to be noted that a star insert 34 is provided which is of the same material as the film 30 though thinner. This insert 34 creates a different type pattern or design than the film 30 to give the article to be ornamented with two areas of different texture or appearance in a general pleasing ornamental manner. Also, of course, obviously, the film could be produced so that portions of it were thicker than other portions at the factory.

In the joining of the thick and thin films (FIGURE 5) PVA films are quite tough and they may be joined by stapling or by sewing with an ordinary sewing machine as used by housewives or by suing a hot iron well known to the plastic film industry.

FIGURE 6 shows another modification in which the film 40 has applied to it a coating 42 as of another plastic such as the acrylic ester polymer mentioned above. There will be that portion 44 which has no coating on it. Therefore, a very similar effect is obtained and the area 44 which has no coating will have a finer crazed pattern than that area 42 which has a crazed pattern.

Specifically, if a stencil in the shape of a star were positioned on the film and the area around the star sprayed with plastic to cover the exposed film, there would be created a design of the star in uncoated surface and the area around the star coated, so that within the star was a fine crazed pattern 50 while around the star, there was a coarser crazed pattern 52 (FIGURE 7). Of course the process could be reversed and the star area coated to produce a coarse effect and around it, uncoated with a fine effect.

One of the interesting phenomena of the coating with a spray coating, is that an indentation will form along the line of demarkation on the boundary between the coated and uncoated portion. This is a pleasing effect inasmuch as it outlines the pattern with a line around the pattern.

Of course, another way of achieving the fanciful design such as the star would be to take a hot, flat iron and to press all that area around the star thus heating the film and leaving the star itself unaffected so that it had a finer crazed pattern.

Further design patterns may be achieved by completely masking the films as by placing a water impervious tape 20 (FIGURE 2) over the film. If it is completely water impervious, this portion will have a completely smooth finish.

Another way of obtaining patterns upon the film is to paint a pattern with oil on the film. The entire film is then sprayed with a plastic coating. Where the oil has been painted on the film, the spray coating will not adhere. The spray coating adheres to the non-oiled surface of the film thus changing the characteristics of the film at these placed. It is to be noted that it is not desirable to use oil on ceramics wherein the tile is fired after forming because it causes defects etc. Alternatively the oil may be coated on the outer surface of the film. In this case, the change of pattern is still achieved because there is a difference in the flexibility or pliability of the film where it has a coating, and still the oil does not contact the cementitious material to contaminate it.

Also, pleasing patterns may be achieved by painting a pattern upon the film with a colored slip of clay slurry and permitting it to dry before the uncolored or a contrasting colored slip is poured into the mold. Where the colored slip is contacted, the film does not necessarily cause a change in the size of the crazed pattern, but it will cause an indentation at the boundary line of where the colored slip first contacted the film and where the ordinary slit contacts the film at a later time.

In all the foregoing cases wherein a pattern is produced, it will be noted that it has been produced by changing the characteristics of the film. Some of the methods in which the characteristics of the film are changed were by applying heat, applying a coating to the film, or by applying slip to a portion of the film before the slip was applied to the rest of the film. It will also be noted that the characteristics of the film can also be changed by lowering the temperature. I.e. if Dry Ice is rubbed over a portion of the film and slip immediately poured therein, the portion wherein the Dry Ice is contacted will have a coarser pattern.

As a further variation, pleasant and various patterns may be achieved by placing a raised or relieved article on the bottom of the form covering the form with a water swellable film and pouring the slip therein. E.g. wire mesh hexagonal patterns of about one inch in diameter (sometimes called chicken wire) may be laid on the bottom of the form. Then the water swellable film is stretched over it. When the slip is poured into the form, the increase in dimensions of the film is taken up primarily allowing the film to fit the contours of the wire. I have found that if a three mil thickness film is used with a hexagonal pattern one inch across, that primarily the expansion of the film is taken up by forming the contours around the wire and that the film is smooth between the wires. Therefore, after the product is formed, the grooves formed by the wires may be filled in by grout and it appears that there is a set pattern of one inch hexagonal tiles. A close examination before grouting will show the crazed pattern along the wires, but it will generally be a smooth pattern between wires.

Another example of the way in which the invention may be used to make bric-a-brac can be given by bringing an irregular shaped object (e.g. an antique pistol half in wet sand). The film may be stretched over it and the slip poured in. Expansion of the film permits the film to follow every contour of the object. Also the film provides an excellent release surface from the molded article.

A variation of this is that an indented mold may be made in the damp sand by removing the object (in this case the pistol) from the damp sand leaving the relieved pattern of the pistol. Again, the water swellable film is placed over the pattern and the slip poured into the film. Again, the expansion of the film allows the slip and the molded article to conform exactly to the pattern of the relieved mold also forming excellent release of the casting from the mold.

USE OF CWS-PVA FILM

All the uses above have been described with a hot water soluble film. I.e. a film which swells, but does not completely dissolve. The HWS film is advantageous in pottery or ceramic work because it is difficult in prior practice to get smooth surfaces. With this process irregularities are not readily noticed due to the desired indentations.

As explained, polyvinyl alcohol may be also made that will dissolve in cold water (CWS-PVA) and this has some particular uses. Cold water soluble film cannot be used with ceramics. When fired the PVA dissolved in the clay or explodes.

A pleasing design can be made by spreading marble chips onto a flat surface and the chips on the flat surface covered with a CWS-PVA film. Then slip is poured over the film. The action is that the film first swells permitting the slip to conform exactly to the contour of the marble chips. Thereafter, the film dissolves permitting the cement to adhere to a part of the surface of the chip. A sufficient amount of the surface of the chip remains exposed. Normally, if the slip contacted the chip directly, without film grinding would be necessary to reval the imbedded chips. Small sea shells could be used rather than marble chips to produce a pleasing design.

Another use for the CWS film is to form a layer between two layers of slip or semi-liquid cementitious material. E.g. a colored cement could be first poured into the mold to about one-quarter inch depth. Thereafter, the colored cement could be covered with a cold water soluble film. Thereafter, ordinary cement could be poured into the form. The ordinary cement would not mix and dilute the color of the colored cement because the cold water soluble film would remain intact long enough to draw enough moisture from the cement so that after it dissolved there would not be sufficient dilution to change the surface coloring. However, the cold water soluble film would dissolve soon enough to permit good bonding between the two cements.

While the invention has been described, it will be understood that it is capable of further modifications and this application is intended to cover any variations, uses, or adaptations of the invention following in general, the principles of the invention and including such departures from the present disclosure as come within known or customary practice in the art to which the invention pertains, and as may be applied to the essential features hereinbefore set forth and as fall within the scope of the invention or the limits of the appended claims.

Having thus described my invention what I claim is:
1. The method of producing an artistic surface design on a molded article comprising:
    (a) facing a mold with a relatively thin dry solvent swellable polyvinyl alcohol film,
    (b) applying within said mold on said film a flowable settable plastic material having incorporated therein said film swellable solvent,
    (c) maintaining said film in contact with said plastic material for a period of time sufficient to cause said solvent to be transferred from said plastic material to said film thereby swelling said film and creating therein wrinkles in the form of nonuniform ridges and valleys, said ridges displacing said plastic material until said plastic sets and said solvent no longer reacts with said film whereby the wrinkles in said film are thereby reproduced in said plastic material, and
    (d) removing said film from the face of said set plastic material.
2. The method of claim 1 and wherein:
    (a) said solvent is water.
3. The method of claim 1 and wherein:
    (a) said film is smooth surfaced,
    (b) said solvent is water, and
    (c) said film is from about 1 to about 3 mils in thickness.
4. The method of claim 1 and wherein:
    (a) said film includes a plurality of areas of different thicknesses thereby to create areas on said article having different depths of surface design.
5. The method of claim 1, and including the step of:
    (a) covering areas of said film prior to applying said plastic material with a solvent resistant material so as to prevent swelling of said film at said areas thereby creating wrinkled and smooth areas on said article.
6. The method of claim 1 and including the step of:
    (a) covering areas of said film with a water resistant material subsequent to facing said mold and prior to applying said plastic material so as to prevent swelling of said film at said areas thereby creating wrinkled and smooth areas on said article.
7. The method of claim 1 and including the step of:
    (a) applying pressure to said mold to create new designs.
8. The method of claim 1 and including the steps of:
    (a) stretching said film in the mold, and
    (b) maintaining said film under tension during setting of said plastic material.
9. The method of claim 1 and including the step of:
    (a) washing said film from said set plastic material by means of water having a temperature above 120° F.
10. The method of claim 1 and including the step of:
    (a) covering portions of said first mentioned film prior to applying said plastic material with a second film of said solvent swellable composition whereby different design effects are created in said article.
11. The method of claim 1 and wherein:
    (a) said film is a hot water soluble polyvinyl alcohol composition.
12. The method of claim 1 and wherein.

(a) said film is a cold water soluble polyvinyl alcohol composition.

13. The method of claim 1 and including the step of:
(a) treating certain areas of said film with Dry Ice prior to applying said plastic material to thereby limit the swelling of said film in said treated areas as compared with said nontreated areas.

14. The method of claim 1 and including the steps of:
(a) placing a form in the bottom of said mold, and
(b) covering said form with said film prior to application of said plastic material.

15. The method of claim 1 and including:
(a) placing a plurality of chips in the bottom of said mold prior to application of said plastic material.

16. The method of claim 1 and including:
(a) initially applying a small amount of said settable plastic material to a specific area of said film and allowing it to set up, and
(b) subsequently applying within said mold the remaining settable plastic material to said film.

17. The method of producing an artistic surface design on a molded article comprising:
(a) placing a wire form having large interstitial areas in the bottom of said mold,
(b) facing said mold and form with a relatively dry water swellable polyvinyl alcohol film,
(c) applying within said mold on said film surface a flowable settable plastic material having water incorporated therein,
(d) maintaining said film in contact with said plastic material for a period of time sufficient to cause said water to be transferred from said plastic material to said film thereby swelling said film specifically at the situs of said wires of said form leaving smooth areas across said interstices, and
(e) removing said film from the face of said set plastic material.

18. A product produced by the process defined in claim 1.

19. A product produced by the process of claim 10.

References Cited by the Examiner

UNITED STATES PATENTS

| | | | |
|---|---|---|---|
| 1,641,553 | 9/1927 | Schemmel | 264—316 |
| 2,140,197 | 12/1938 | Batcheller | 50—454 |
| 2,172,466 | 9/1939 | Edwards et al. | 264—225 |
| 2,867,560 | 1/1959 | Strawinski. | |
| 3,048,511 | 8/1962 | Strawinski. | |

FOREIGN PATENTS 346,888   4/1931   Great Britain.

ALEXANDER WYMAN, *Primary Examiner.*

MORRIS SUSSMAN, EARL M. BERGERT, *Examiners.*